United States Patent

[11] 3,579,806

[72] Inventor Gerard Huberdeau
    Atelier de Construction de Tarbes, France
[21] Appl. No. 834,632
[22] Filed June 19, 1969
[45] Patented May 25, 1971
[73] Assignee French State represented by the Minister of Armed Forces Ministerial Delegation of Weapons, Technical Delegation of Land Weapons Manufacturing Workshops of Tarbes
    Paris, France
[32] Priority June 19, 1968
[33] France
[31] 155,597

[54] METHOD OF PRODUCING TOROIDAL BODIES FROM HARD, BRITTLE STEELS
    10 Claims, 9 Drawing Figs.
[52] U.S. Cl. ................................................. 29/463,
    29/482, 220/1.5, 220/3
[51] Int. Cl. ............................................. B21d 39/02
[50] Field of Search ........................................... 29/463,
    482, 157 (A); 113/120 (S), 120 (O); 220/3, 1.5

[56] References Cited
UNITED STATES PATENTS

| | | | |
|---|---|---|---|
| 45,083 | 11/1864 | Savoral ........................... | 29/463 |
| 1,678,744 | 7/1928 | Olsen ............................. | 29/157(A) |
| 2,192,471 | 3/1940 | Harbison ....................... | (29/463UX) |
| 2,314,442 | 3/1943 | Cook .............................. | 220/3 |
| 2,335,887 | 12/1943 | Smith ............................ | 29/157(A) |

FOREIGN PATENTS

| | | | |
|---|---|---|---|
| 978,939 | 4/1951 | France ........................... | 29/157(A) |
| 355,286 | 6/1922 | Germany ...................... | 29/463 |

Primary Examiner—Charlie T. Moon
Attorney—Waters, Roditi, Schwartz & Nissen

ABSTRACT: A toroidal body of hard, brittle material is produced by joining two semicircular toroidal bodies in face-to-face relation, each semicircular toroidal body being formed from a ring of material by first spin forming the ring in two steps to produce a U-shape peripheral portion on the ring, thereafter machining the peripheral portion to provide uniform thickness and then heat treating the body and hot stamping the same to form semicircular portions on said peripheral portions which are separated from the remainder of the body by machining.

PATENTED MAY 25 1971                              3,579,806

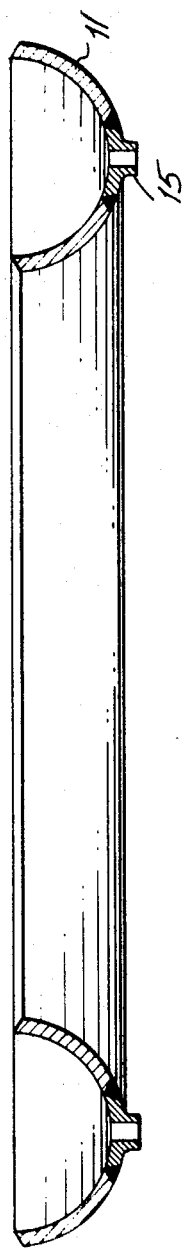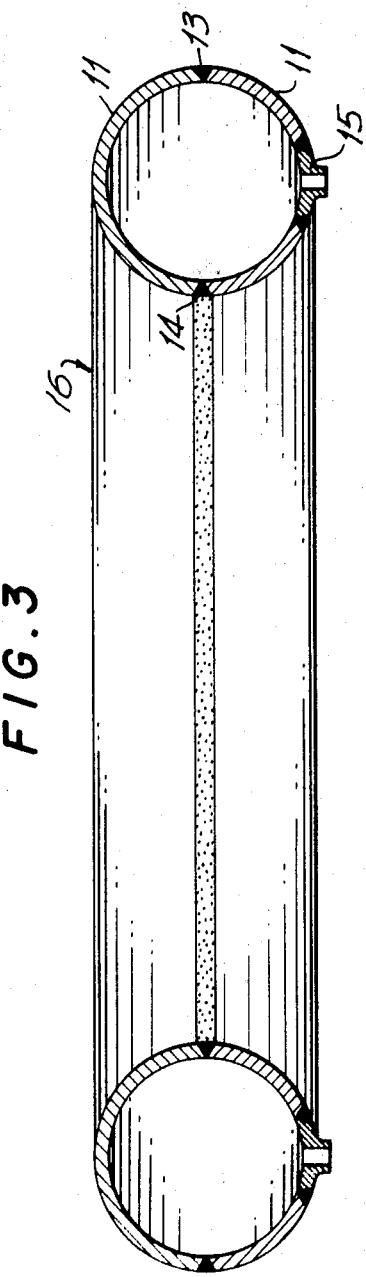

METHOD OF PRODUCING TOROIDAL BODIES FROM HARD, BRITTLE STEELS

BRIEF SUMMARY OF THE INVENTION

The present invention relates to a process for producing toroidal containers from materials, which possess high mechanical strength and which are hard and brittle and are difficult to form in a stamping press. According to the invention the process utilizes several metal-working techniques, namely: spin forming, press forming, milling, welding and heat treating. The mechanical characteristics of the materials used (such as high nickel steel, e.g. Maraging steel) are an obstacle to the forming in the stamping press of shapes, such as the sections of toroidal containers.

As a matter of fact, obtaining curved shapes of relatively small radius of such material in a stamping press is invariably accompanied by flaws, fissures, and especially by a lack of uniformity in thickness.

It goes without saying, that such deficiencies impair the strength, and, therefore, the safe utilization of the articles fabricated in this manner, so that the use of such materials is limited to the production of shapes not requiring forming in the stamping press.

The invention contemplates overcoming these difficulties, and is specifically based upon the procedure of the forming operations.

In accordance with the invention, there is provided a method comprising spin forming a ring of hardened, low ductility material to deform the ring and produce a flat central inner portion and a peripheral outer portion of U-shape extending below the central inner portion, the ring thus deformed by the spin forming being free of flaws and cracks, heat treating the thus deformed ring for stress relief, hot stamping the deformed ring to produce, in said outer portion thereof, a toroid of semicircular cross section with upwardly projecting legs, machining said outer portion of the deformed ring to leave only the semicircular toroid, and securing two semicircular toroids together in face-to-face relation to form a toroidal body of circular cross section.

BRIEF DESCRIPTION OF THE DRAWING

FIG. 2 shows the semitoroid in section after a subsequent stage of production; and FIG. 3 is a sectional view of the completed toroidal body.

DETAILED DESCRIPTION

Figure 1A:
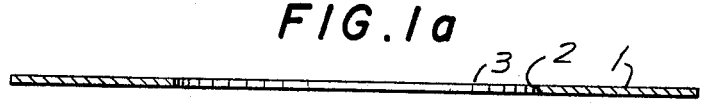
FIGS. 1a—1g show a number of sections representing successive stages in the production of a semitoroid.

Referring to the drawing, FIG. 1a shows a sectional elevation view of a ring 1 of a hard, brittle, low-ductility steel, e.g. steel with a high nickel content such as Maraging steel of type 250, having an 18 percent Ni content and 7.5 mm. thickness. The ring is reduced to a uniform thickness of 6.8 mm. by planing both its surfaces on a planing machine.

Moreover, prior to the next step, the internal surface 2 of the ring 1 at the bore 3 is machined to a definite dimension on a lathe.

Figure 1B:
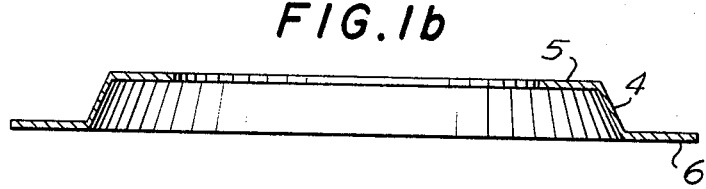

FIG. 1b shows the workpiece in sectional elevation after a first spin-forming step, by which the ring has been shaped for the inner face of the toroid. Namely, the ring has been deformed to produce a step 4 between inner portion 5 and flat outer portion 6.

Figure 1C:
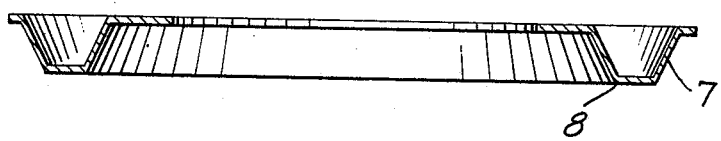

FIG. 1c shows the workpiece in sectional elevation after a second step of spin forming, by which the shaping for the outer face of the toroid has been obtained. Namely, the flat, outer portion 6 of FIG. 1b has been deformed to a generally U-shaped outer portion with an outer wall 7. The semifinished workpiece shown in FIG. 1c, and obtained by these two steps of spin forming, is a semitoroid, or preform, in which the U-shaped outer portion is of trapezoidal cross section.

At this stage of the production, it is found, that the semifinished workpiece is free of flaws or cracks. The spin-formed pieces have an excellent fibrous structure, which is identical to that obtained in a forging operation. Since the metal is plastically deformed, no rupturing of its fibers has occurred.

This preform will now permit the final forming operation by hot stamping on a 1,200-ton press without affecting the homogeneity, or the strength of the metal, while consistently maintaining the constant wall thickness.

Figure 1D:
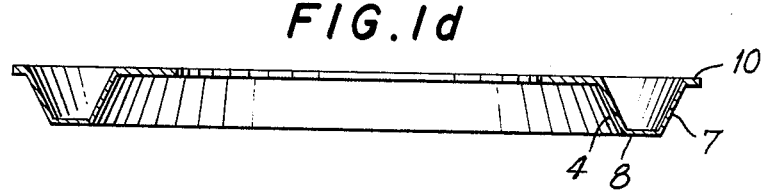
Figure 1E:
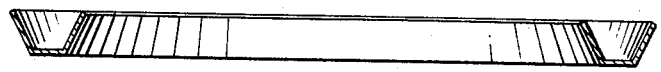

Prior to the hot stamping, however, the following necessary preparatory operations are preformed:

1. heat treatment for renewed stress relief at 820° C. for 1 hour;
2. machining of the outer surface of the bottom 8 to obtain the same thickness as the spin-formed sidewalls 4 and 7, whereby the trapezoidal transverse section has uniform thickness as shown in FIG. 1d;
3. trimming of the rims 5 and 10 to eliminate all that remains from the initial sheet steel ring, as shown in FIG. 1e.

Figure 1F:
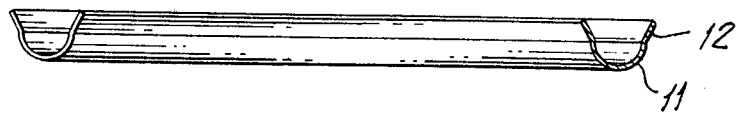
Figure 1G:
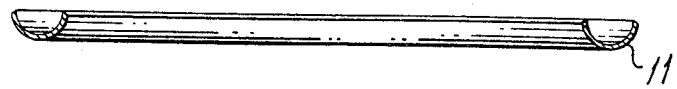

The workpiece as shown in FIG. 1e is than hot stamped and FIG. 1f shows the workpiece as it comes from the stamping press. It is now formed as a semitoroidal 11 of semicircular cross section of the desired dimensions, except for the upwardly projecting legs or rims 12 which are excess material. This semitoroid 11 is machined on a lathe (internal and external roughing) to remove rims 12 and to provide the proper depth for semitoroid 11. This is followed by a final edge calibration on a planing machine. FIG. 1g shows the workpiece 11 in sectional elevation, after this last operation.

The final toroid container is constituted by two semitoroids produced by the process heretofore described. Such toroid container is shown in FIG. 3.

To facilitate the assembly by welding, the inner and outer legs 13, 14 are provided with a chamfer of 45°.

Only one of the two semitoroids receives tubular connection fittings 15 which are welded to and serve for filling the finished container. FIG. 2 shows a semitoroid workpiece 11 at this stage, in sectional elevation. The two semitoroids of FIG. 1g and FIG. 2, prepared in this manner, are joined by automatic welding (argon-submerged electric arc), whereby the desired toroidal container 16 of circular cross section is completed, as represented in sectional elevation in FIG. 3.

This completed container undergoes stress relief by heat treatment at 820° for 1 hour, followed by a 5-hour aging treatment at 480° C. The toroidal container thus produced is then subjected to dimensional checks, as well as to acceptance tests, in particular to hydrostatic pressure testing at 400 bars (5,800 p.s.i.), in which no deformation, or leak, is tolerated.

As has been demonstrated, the invention describes a novel manufacturing process for the production of toroidal containers from materials of high mechanical strength which are hard and brittle and which are difficult to produce by press forming. It goes without saying, that numerous modifications can be made in the application of this process, without departing from the scope of the invention.

I claim:

1. A method of producing toroidal bodies from hard, brittle, low ductility material, said method comprising spin forming a ring of hardened, low ductility material to deform the ring and produce a flat central inner portion and a peripheral outer portion of U-shaped extending below the central inner portion, the ring thus deformed by the spin forming being free of flaws and cracks, removing said flat central inner portion from said ring, heat treating the thus deformed ring for stress relief, hot stamping the deformed ring to produce, in said outer portion thereof, a toroid of semicircular cross section with upwardly projecting legs, machining said outer and inner portions of the deformed ring to leave only the semicircular toroid, and securing two thus formed semicircular toroids together in face-to-face relation to from a toroidal body of circular cross section.

2. A method as claimed in claim 1 wherein said material is austenitic steel with a high nickel content.

3. A method as claimed in claim 1 wherein said toroids are secured by welding.

4. A method as claimed in claim 1 wherein said U-shape outer portion of the deformed ring is machined prior to the heat treatment to remove remaining portions of the ring formed on said U-shape outer portion.

5. A method as claimed in claim 1 wherein said U-shape outer portion of the deformed ring is machined, prior to the heat treatment, to equalize the thickness of the walls thereof.

6. A method as claimed in claim 1 wherein said heat treatment comprises heating the deformed ring at 820° C. for 1 hour.

7. A method as claimed in claim 6 comprising heat treating the toroidal body of circular cross section at 820° C. for 1 hour and thereafter aging the body by heating the same at 480° C. for 5 hours.

8. A method as claimed in claim 1 comprising attaching a connection fitting to one of the toroids to enable filling the toroidal body.

9. A method as claimed in claim 1 wherein said outer portion of U-shape is trapezoidal.

10. A method as claimed in claim 1 wherein said outer portion of U-shape is trapezoidal to facilitate transformation of the trapezoidal shape by the hot stamping of semicircular shape with least possible deformation of metal.